United States Patent Office 3,524,134
Patented Aug. 11, 1970

3,524,134
CATHODE RAY TUBE MEANS FOR DIGITAL MEASUREMENT OF CONTINUOUS QUANTITIES
Libura Lech Andrzej, Wiejska 9/122, Warsaw, Poland
Filed May 2, 1967, Ser. No. 635,420
Claims priority, application Poland, May 2, 1966,
P 114,377
Int. Cl. G01r 13/20, 13/22
U.S. Cl. 324—121            1 Claim

ABSTRACT OF THE DISCLOSURE

A cathode ray tube known as a convertron, having an electrode which when swept by the beam generates a series of pulses, is used for digital measurements. The beam is deflected by an analog voltage corresponding to the quantity to be measured. Periodic sweeps are provided by subtracting from the analog voltage a periodic signal such as a sawtooth wave. Each sweep generates a series of pulses, a sum of which is averaged by a decade counter.

DRAWING

DETAILED DESCRIPTION

Figure 1:
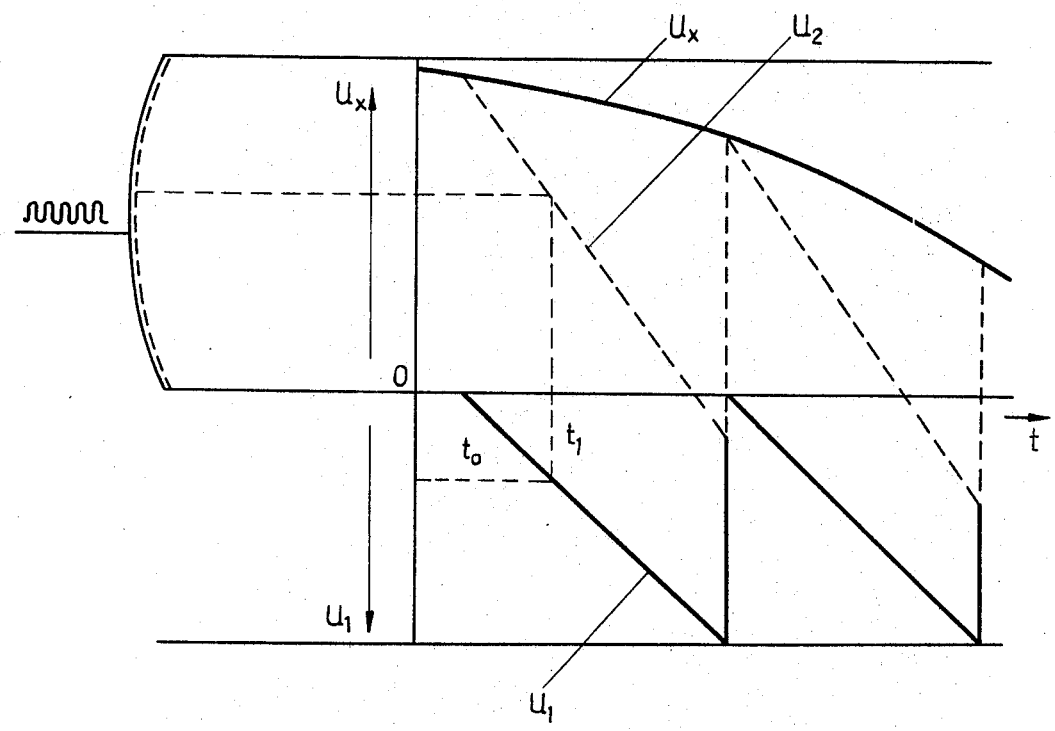
FIG. 1 illustrates voltages as a function of time at the input of an amplifier and on the deflection plates of a convertron employed in a preferred embodiment of the invention.

In Polish Pat. No. 48,802 is disclosed an arrangement for converting analog quantities into numerical quantities, the arrangement comprising a cathode ray tube called "convertron" in which a voltage proportional to a quantity being measured, applied to deflection plates, results in a deflection of the electron beam by an angle proportional to the voltage. The beam so deflected travels along an anticathode which includes a series of successive elements, opposite each other, having different values of secondary emission coefficient. As a result, at the output of the convertron, a series of current pulses are generated. In the arrangement according to Polish Pat. No. 48,802, at the input of the convertron, is used an integrating amplifier of a linear characteristic to which the voltage being measured, which is proportional to the analog quantity, is applied. As a result, on the deflection plates of the convertron, connected to the output of the amplifier, appears a linearly changing voltage, the rate of which being proportional to the analog quantity.

At the output of the convertron, according to Polish Pat. No. 48,802, there is a gating circuit opened by the integrating amplifier connected to the input. A decade counter connected to the gating circuit counts the pulses passed through the gating circuit during an opening of the gate.

An object of the invention is to provide an improved method of measuring analog quantities with digital readout with specially the physical quantities which changes continuously. In a preferred embodiment of the invention, the above noted convertron is used.

According to the method of the invention, the difference of two voltage is applied to the convertron's plates. These voltages are a measured voltage and an auxiliary voltage or so-called reading voltage. Under the influence of the difference of these voltages, the electron beam is deflected resulting, at the output of the convertron, in the generation of the pulses number of which is proportional to the value of the measured voltage. The quantity measured by the method according to the invention is sampled many times and the measurement result is the arithmetic means of all samples.

In the arrangement, according to the invention, at the input of the convertron, a differential amplifier is used to which the voltage proportional to the quantity being measured is supplied as well as the voltage generated in the reading voltage generator. In this way, the difference of these voltages is supplied to the convertron's plates which deflects the electron beam by the angle proportional to the value of this difference.

The pulses obtained at the output of the convertron are supplied through the gating circuit noted above to a decade counter which has a system of decimal division. It thus counts the pulses of all measuring series and gives in numerical form the averaged result of the measurement. The reading voltage supplied to the differential amplifier from the reading voltage generator is a periodically alternating voltage of a definite shape, e.g., of a sawtooth shape. The reading generator is controlled by a synchronizing pulse generator which determines the sampling rate.

The method of measuring, according to the invention, and the principle of the arrangement operation are next explained with reference to the attached drawings.

More particularly, a convertron as known from Polish Pat. No. 48,802 includes an electron gun 1 emitting an electron beam 2 which is deflected by means of deflection plates 3. The convertron further includes an electrode 4 consisting of opposed elements 5 and 6 having different coefficients of secondary emission.

The voltage $U_1$ of a reading generator 8 is supplied to a differential amplifier 7 in a phase opposite that of the measured voltage $U_x$. In this way, at the moment the value of the reading voltage $U_1$ is zero, a full measured voltage $U_x$ appears on the deflection plates of the convertron.

Under the influence of the measured voltage $U_x$, at the first instant of measurement "$t_0$," the electron beam 1 is rapidly deflected from its initial position and impinges on the electrode element 4 as determined by the actual value of the measured voltage $U_x$. At time $t_1$ the reading voltage $U_1$ applied, oppositely to the measured voltage, to the input of the differential amplifier 7, begin to grow gradually from zero to the maximum value which results in applying the voltage $U_2$ to the deflection plates of the convertron which voltage is equal to the difference of the measured voltage and the reading voltage.

Under the influence of this voltage, the electron beam 2 travels from the position determined by the measured voltage $U_x$, in the direction of the initial position and sweeps the successive elements 5 and 6 of the electrode 4, thus resulting in the generation of pulses at the output of the convertron. Since the reading voltage $U_1$ grows continuously, the electron beam travels continuously to the next successive elements 5 and 6 of the electrode 4. As a result of this sweeping of the electron beam, at the output of the convertron a series of pulses is obtained which number is exactly equal to the number of elements 5 or 6 of the electrode 4 across which the electron beam passes during its way back. The number of these pulses is a representation of the measured voltage $U_x$.

Thus, by means of the reading voltage, the reading of the actual position of the electron beam is obtained. The result of the reading is that, at the output of the convertron, a sample of the measured voltage appears consisting of a series of pulses in a number proportional to the measured quantity.

The frequency of the reading generator 8 is controlled by the synchronizing pulse generator 9 which, at the same time, controls the time of opening of the gate 10 in such a way that the number of the samples, transmitted through the gate 10 to the counter 11, is always divisible by ten. The synchronizing pulse generator 9 is such that it makes possible to change the number of samples at a decimal rate. The generator 9 can be adjusted in relation to the determined number of tens of samples.

The system of adjusting the decimal quantity of samples in the generator 9 is connected to the system of decimal division in the counter 11 in such a way that the sum of pulses counted by the counter 11 is at the same time divided by the quantity of samples being the multiple of ten, as a result of which the counter indicates the decimally averaged result of the measurement in digital form.

Figure 2:
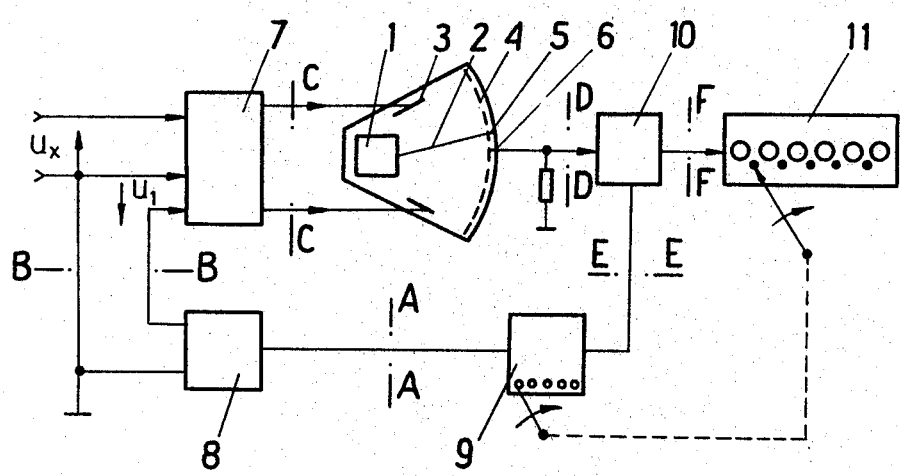
FIG. 2 is a block diagram of the circuit of the invention.
Figure 3:
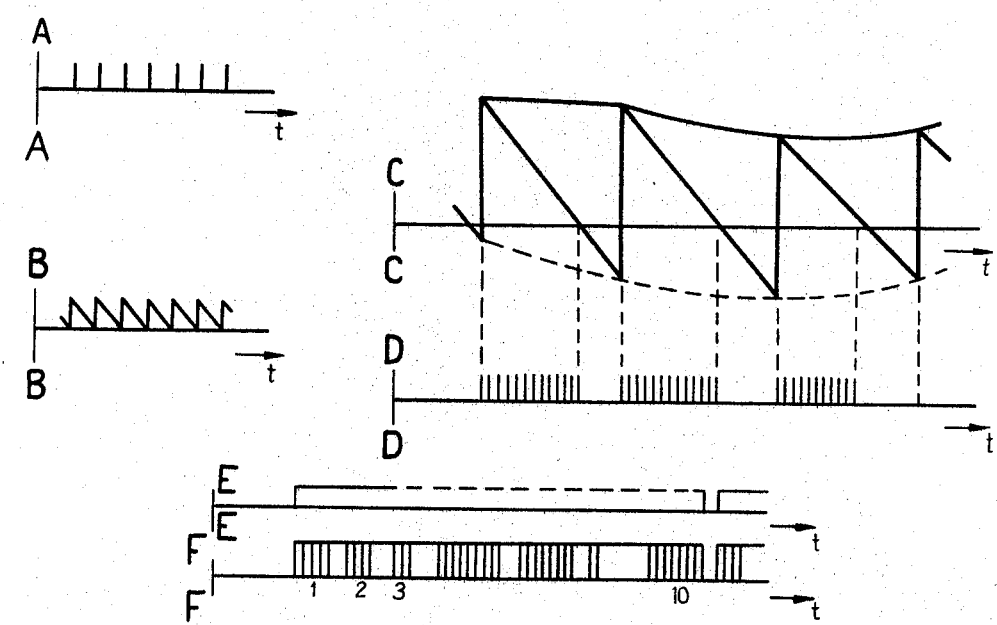
FIG. 3 illustrates voltage curves at particular points in the block system of FIG. 2.

The voltages illustrated in FIG. 3 concern the voltages at particular points of the system of FIG. 2 in which these points are indicated by appropriate letters.

Each pulse at A going from the synchronizing generator 9 to the reading generator 8 gives rise to single run of a sawtooth wave which is applied to the input of the differential amplifier 7. To the amplifier 7 is supplied also the measured voltage $U_x$ of opposite phase which results in a voltage, at the output of the amplifier 7, of the shape shown by C. This latter voltage is applied to the deflection plates 3.

A series of pulses D comes from the electrode 4 of the convertron, these being generated under the influence of the returning electron beam. The pulses are fed to the gate 10.

The pulses E coming from the second output of the synchronizing pulse generator 9 determine the time of the opening of the gate 10 which, as stated above, is so adjusted that to the counter 11 comes a number of the series of pulses divisible by ten as shown at F.

What I claim is:

1. An apparatus for digital measurement of analog quantities expressed by voltage comprising, a cathode ray tube constituted as a convertron having a source of an electron beam, deflection plates for deflecting said beam, a collector and a target system including alternating elements of different secondary emission coefficients and adapted for generating pulses when being swept by said beam; a differential input amplifier for generating a deflection voltage for deflecting said beam along said target system a distance proportional to the difference between the input analog voltage to be measured and a maximum value of a periodic input waveform reading voltage; a voltage generator for generating said reading voltage; a decade counter; a gate for gating pulses from the output of said convertron to the decade counter; a synchronizing generator for generating a prescribed number of synchronizing pulses to control the frequency of said reading voltage generator and to open said gate and reset said decade counter; and means for simultaneously adjusting the prescribed number of pulses produced by the synchronizing generator and the division factor of the counter; whereby the quantity of pulses generated by said convertron and counted in said counter is representative of said measured voltage.

References Cited

UNITED STATES PATENTS

| 3,064,193 | 11/1962 | Grubb et al. | 324—120 |
| 2,957,104 | 10/1960 | Roppel | 340—347 XR |
| 3,201,781 | 8/1965 | Holland | 324—99 XR |
| 3,260,943 | 7/1966 | Huelsman et al. | 324—99 XR |
| 3,324,345 | 6/1967 | Barwicz et al. | 340—347 XR |

RUDOLPH V. ROLINIC, Primary Examiner

E. F. KARLSEN, Assistant Examiner

U.S. Cl. X.R.

324—120; 340—347